Oct. 14, 1969 R. S. HUGHES 3,473,135
VARIABLE REFERENCE VIDEO AMPLIFIER
Filed Dec. 8, 1967
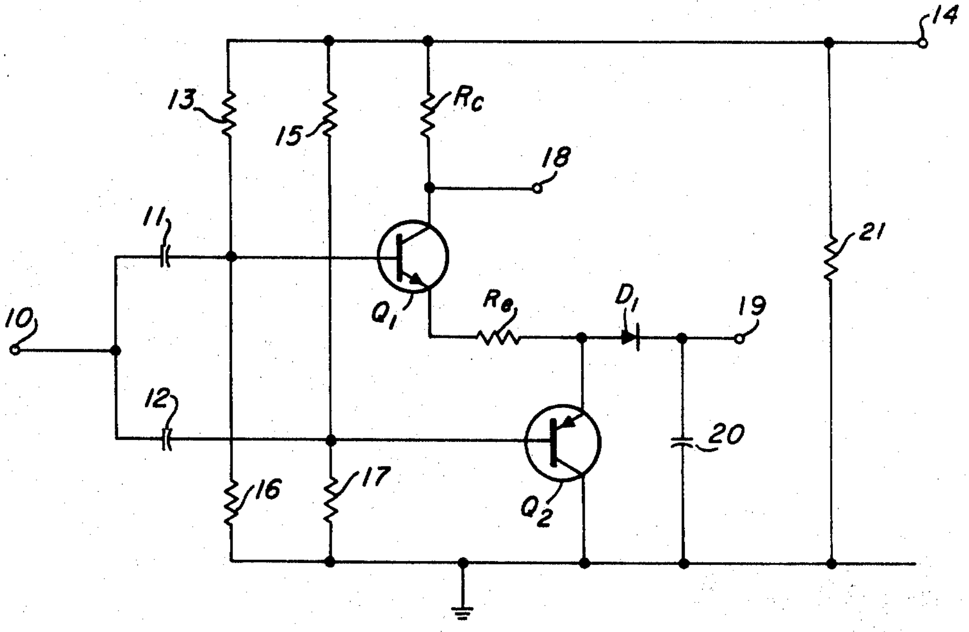
INVENTOR.
RICHARD S. HUGHES
BY Roy Miller
ATTORNEY United States Patent Office 3,473,135

Patented Oct. 14, 1969

3,473,135

VARIABLE REFERENCE VIDEO AMPLIFIER

Richard S. Hughes, China Lake, Calif., assignor to the United States of America as represented by the Secretary of the Navy Filed Dec. 8, 1967, Ser. No. 689,135
Int. Cl. H03f 3/04, 3/68
U.S. Cl. 330—24 6 Claims

ABSTRACT OF THE DISCLOSURE

A variable reference video amplifier having the characteristic $e_{out}=-K_1e_{in}+K_2$ where $K_2$ is a variable reference.

Government interest

The invention described herein may be manufactured and used by or for the Government of the United States of America for governmental purposes without the payment of any royalties thereon or therefor.

Background of the invention

The invention relates to transistor amplifier circuits in which the output voltage may be varied as determined by a variable reference voltage. One type of a variable gain transistor circuit is illustrated in U.S. Patent 3,023,369 wherein the gain of the amplifier may be varied over a relatively wide range of signal amplitude levels. In the patent, the effective emitter load impedance or resistance is varied in order to control the gain of the stage.

Summary of the invention

In the present invention a video amplifier is provided having an input coupled to the base element of a transistor and having the emitter connected through a unidirectional impedance means to a variable reference voltage source. The unidirectional impedance means is normally back biased and is connected through an electronic means to the input voltage. When an input voltage is present at the electronic means the unidirectional impedance means is forward biased and the variable reference voltage applied to the emitter of the video amplifier thus controlling the output voltage level.

Brief description of the drawing

The figure is a schematic diagram of the variable reference video amplifier.

Description of the preferred embodiment

In the figure, an input voltage $e_{in}$ is coupled in at input terminal 10 to one side of coupling capacitors 11 and 12, respectively. Coupling capacitor 11 is connected to the base element of a transistor $Q_1$ and through a resistor 13 to a bias supply 14. Coupling capacitor 12 in turn, is coupled to the base element of another transistor $Q_2$ and also coupled through a resistor 15 to the bias voltage source 14.

Coupling capacitor 11 is also connected to the common connection of resistor 13 and the base element of transistor $Q_1$ and to ground through another resistor 16. Also, the common connection of the base of transistor $Q_2$, resistor 15 and coupling capacitor 12 is connected to ground through a resistor 17.

Bias is supplied from the bias supply 14 through resistor $R_c$ to the collector of transistor $Q_1$ and the collector is also connected to output terminal 18. The emitter of transistor $Q_1$ is connected through resistor $R_e$ to the emitter of the transistor element $Q_2$ and also connected to the anode element of a unidirectional impedance $D_1$. The cathode of $D_1$ is connected to a variable reference voltage $V_1$ at terminal 19.

The collector of the transistor $Q_2$ is connected directly to ground. The variable reference voltage $V_1$ is connected through a decoupling capacitor 20 to ground also. The bias supply 14 is also connected through a resistor 21 to ground.

The operation is as follows. The input signal, $e_{in}$, is coupled to the base of $Q_1$ and $Q_2$. The signal amplitude at the emitter of $Q_1$ is of the same magnitude as the input signal, $e_{in}$.

The signal amplitude at the emitter of $Q_2(V_eQ_2)$ will be of the same magnitude as the input signal, $e_{in}$, until the input signal exceeds $V_1$. When the signal at the emitter of $Q_2$ exceeds $V_1'$ (where $V_1'$ is defined as the D.C. voltage across $D_1$ or $V_1-V_eQ_2$ with no signal present) the amplitude of the emitter signal remains constant and independent of $e_{in}$. That is, the A.C. signal at the emitter of $Q_2$ is: $V_eQ_2=V_1'+V_{D_1}$ for $e_{in}>V_1$.

The A.C. (signal) current through $R_e$ then becomes $$i_e=e_{in}-\frac{(V_1'+V_{D_1})}{R_e}$$

and the output signal at 18 is then $$e_{out}=-\frac{R_c}{R_e}e_{in}+\frac{R_c}{R_e}(V_1'+V_{D_1}) \text{ or } e_{out}=-K_1e_{in}+K_2$$

Obviously many modifications and variations of the present invention are possible in the light of the above teachings. It is therefore, to be understood that the invention may be practiced otherwise than as specifically described.

What is claimed is:

1. A variable reference video amplifier for providing an output $e_{out}=-K_1e_{in}+K_2$ where $K_1$ is a constant, $e_{in}$ corresponds to an input to the amplifier and $K_2$ is another constant comprising:

input means adapted to receive a voltage $e_{in}$;

transistor means having the base coupled to said input means, the collector grounded, and an output at the emitter present only when input voltage $e_{in}$ is present;

a variable voltage source;

unidirectional impedance means coupled between the variable voltage source and the emitter of said transistor;

amplifier means also having an input coupled to said input means adapted to receive a voltage $e_{in}$, an output and a controlled element;

said controlled element being operatively coupled to the output of said transistor means and said variable voltage source;

said output from said amplifier means being dependent upon the input voltage $e_{in}$ and the variable voltage source; and when $e_{in}$ exceeds the value of the variable voltage source, the unidirectional impedance means appears as a very low impedance;

when $e_{in}$ is les than the value of the variable voltage source, the unidirectional impedance means appears as a very high impedance; so that there is no output at the amplifier means unless the value of $e_{in}$ exceeds the value of the variable voltage source.

2. A variable reference video amplifier as set forth in claim 1 and further including:

a source of bias voltage connected to said output element of the amplifier means through a resistance.

3. A variable reference video amplifier as set forth in claim 2 and further including:

another resistance means operatively coupled between said voltage source and the control element of the amplifier means.

4. A variable reference video amplifier as set forth in claim 3 wherein:

$K_1$ equals the ratio of the resistance means between the bias voltage source and the output element of the amplifierf means and another resistance means operatively coupled between the voltage source and the control element of the amplifier means.

5. A variable reference video amplifier as set forth in claim 4 wherein:

$K_2$ comprises the resistance ratio set forth in claim 4 times the voltage the sum of the voltage source and the voltage drop across the unidirectional impedance means.

6. A variable reference video amplifier as set forth in claim 5 wherein the amplifier means comprises a transistor having:

the base coupled to said input means;

the collector coupled to said source of bias voltage through a resistance; and the emitter coupled to the emitter of said first mentioned transistor means through another resistance means.

References Cited

UNITED STATES PATENTS

| | | | |
|---|---|---|---|
| 2,986,655 | 5/1961 | Wiseman et al. ___ | 307—253 X |
| 3,310,731 | 3/1967 | Ostroff et al. _____ | 330—24 X |

ROY LAKE, Primary Examiner

L. J. DAHL, Assistant Examiner

U.S. Cl. X.R.

330—29